United States Patent [19]

Shyu

[11] Patent Number: 5,510,852
[45] Date of Patent: Apr. 23, 1996

[54] METHOD AND APPARATUS USING SYMMETRICAL CODING LOOK-UP TABLES FOR COLOR SPACE CONVERSION

[75] Inventor: Rong-Fuh Shyu, Hsinchu, Taiwan

[73] Assignee: Winbond Electronics, Corp., Hsinchu, Taiwan

[21] Appl. No.: 234,426

[22] Filed: Apr. 28, 1994

[51] Int. Cl.$^6$ .............................. H04N 9/67; H04N 1/46; G09G 5/04
[52] U.S. Cl. ........................ 348/660; 345/154; 358/530
[58] Field of Search .......................... 358/518, 523, 358/530; 348/571, 659, 660, 714, 718; 345/153, 154; H04N 1/56, 1/60, 9/64, 9/67, 1/46

[56] References Cited

U.S. PATENT DOCUMENTS

| | | | |
|---|---|---|---|
| 4,507,676 | 3/1985 | Dischert et al. | 348/660 |
| 4,835,599 | 5/1989 | Sigel | 348/660 X |
| 5,124,688 | 6/1992 | Rumball | 348/660 X |
| 5,262,847 | 11/1993 | Rodriguez et al. | 348/571 X |
| 5,272,468 | 12/1993 | Read | 345/153 |
| 5,416,614 | 5/1995 | Crawford | 358/530 |

*Primary Examiner*—Victor R. Kostak
*Assistant Examiner*—John W. Miller
*Attorney, Agent, or Firm*—Harness, Dickey & Pierce

[57] ABSTRACT

A method and apparatus for performing color space conversion between digitized YCbCr components and digitized RGB components uses a color lookup table unit which is provided with transformation component values based on a selected one of two sets of conversions. A plurality of adders are coupled to the lookup table unit so as to receive the outputs thereof and generate individual color components of converted space by adding the transformation component values corresponding to each of the individual color components of converted space relative to the color components of original space.

10 Claims, 8 Drawing Sheets

| PIm VALUE | SYMMETRICAL ADDRESS FOR CODING TABLE | POLARITY OF Cnm (PIm-128) VERSUS Cnm \|PIm-128\| | REMARK |
|---|---|---|---|
| 0 | 0 | | |
| 1 | 127 | − | |
| 2 | 126 | − | Cnm (PIm-128) = |
| 3 | 125 | − | −Cnm \|PIm-128\| |
| . . . | . . . | . . . | |
| 126 | 2 | − | |
| 127 | 1 | − | |
| 128 | 0 | 0 | Cnm (PIm-128) = 0 |
| 129 | 1 | + | |
| 130 | 2 | + | |
| . . . | . . . | . . . | Cnm (PIm-128) = |
| 253 | 125 | + | Cnm \|PIm-128\| |
| 254 | 126 | + | |
| 255 | 127 | + | |

METHOD AND APPARATUS USING SYMMETRICAL CODING LOOK-UP TABLES FOR COLOR SPACE CONVERSION

BACKGROUND OF THE INVENTION

1. Field of the Invention

This invention relates to a method and apparatus for performing color space conversion, more particularly to a method and apparatus for performing color space conversion between digitized YCbCr color components and digitized RGB color components.

2. Description of the Related Art

Nowadays, due to the growing popularity of multimedia applications, the development of advanced data processing techniques for digital audio data and digital video data has become more and more important. It is noted that, due to the limited bandwidth of the transmission networks and the limited storage spaces of the existing computer systems, digital video data have to be compressed before transmission or storage. Thereafter, the compressed data are decompressed so as to obtain the original digital video data from the storage or transmission media.

Presently, digitized YCbCr components, wherein the Y component represents luminance or picture brightness, the Cb component (B-Y) represents the scaled difference between the blue value (B) and the luminance (Y), and the Cr component (R-Y) represents the scaled difference between the red value (R) and the luminance (Y), are used in known compression algorithms since the digitized YCbCr components occupy less bandwidth when compared to digitized RGB (Red-Green-Blue) components which are obtained by passing analog RGB signals through an analog-to-digital converting means. However, the existing imaging and displaying apparatuses generally use analog RGB signals to represent image. Therefore, the analog RGB signals must initially pass through an analog-to-digital converting means and are then converted into digitized YCbCr components before compression. The digitized YCbCr components are converted into the digitized RGB components after decompression. If necessary, the digitized RGB components are converted into analog RGB signals.

Although there are many conventional techniques for color space conversion, the architecture of the conventional techniques permits conversion in only one mode, that is, either converting YCbCr components to RGB components or converting RGB components to YCbCr components. Additionally, the conventional techniques are expensive due to the large memory requirements thereof. Furthermore, the conventional techniques that use multipliers are relatively expensive and have a relatively slow operating speed.

SUMMARY OF THE INVENTION

Therefore, the main object of the present invention is to provide a method and apparatus for performing color space conversion between digitized YCbCr color components and digitized RGB color components, which method and apparatus are inexpensive and are highly efficient.

Accordingly, an apparatus of the present invention is capable of performing color space conversion between digitized YCbCr color components and digitized RGB color components. When converting the digitized YCbCr color components to the digitized RGB color components, digitized transformation component values corresponding to a Y-in-R component, a Cb-in-R component, a Cr-in-R component, a Y-in-G component, a Cb-in-G component, a Cr-in-G component, a Y-in-B component, a Cb-in-B component and a Cr-in-B component, are placed into a programmable color lookup table means based on a set of conversions from individual digitized Y, Cb and Cr components. The color lookup table means has a plurality of address inputs and includes first to ninth segments. The transformation component values corresponding to the Y-in-R component, the Y-in-G component, the Y-in-B component, the Cb-in-R component, the Cb-in-G component, the Cb-in-B component, the Cr-in-R component, the Cr-in-G component and the Cr-in-B component occupy the first to ninth segments, respectively. The digitized Y, Cb and Cr components are inputted to the address inputs of the color lookup table means to effect reference to the corresponding Y-in-R transformation component value, the corresponding Cb-in-R transformation component value, the corresponding Cr-in-R transformation component value, the corresponding Y-in-G transformation component value, the corresponding Cb-in-G transformation component value, the corresponding Cr-in-G transformation component value, the corresponding Y-in-B transformation component value, the corresponding Cb-in-B transformation component value and the corresponding Cr-in-B transformation component value. The corresponding Y-in-R transformation component value, the corresponding Cb-in-R transformation component value and the corresponding Cr-in-R transformation component value are added to obtain the digitized R component. The corresponding Y-in-G transformation component value, the corresponding Cb-in-G transformation component value and the corresponding Cr-in-G transformation component value are added to obtain the digitized G component. Finally, the corresponding Y-in-B transformation component value, the corresponding Cb-in-B transformation component value and the corresponding Cr-in-B transformation component value are added to obtain the digitized B component.

When converting the digitized RGB color components to the digitized YCbCr color components, digitized transformation component values corresponding to an R-in-Y component, a G-in-Y component, a B-in-Y component, an R-in-Cb component, a G-in-Cb component, a B-in-Cb component, an R-in-Cr component, a G-in-Cr component and a B-in-Cr component, are placed into the programmable color lookup table means based on a set of conversions from individual digitized R, G and B components. The transformation component values corresponding to the R-in-Y component, the R-in-Cb component, the R-in-Cr component, the G-in-Y component, the G-in-Cb component, the G-in-Cr component, the B-in-Y component, the B-in-Cb component and the B-in-Cr component occupy the first to ninth segments of the color lookup table means, respectively. The digitized R, G and B components are inputted to the address inputs of the color lookup table means to effect reference to the corresponding R-in-Y transformation component value, the corresponding G-in-Y transformation component value, the corresponding B-in-Y transformation component value, the corresponding R-in-Cb transformation component value, the corresponding G-in-Cb transformation component value, the corresponding B-in-Cb transformation component value, the corresponding R-in-Cr transformation component value, the corresponding G-in-Cr transformation component value and the corresponding B-in-Cr transformation component value. The corresponding R-in-Y transformation component value, the corresponding G-in-Y transformation component value and the corresponding B-in-Y transformation component value are added to obtain the digitized Y component. The corresponding R-in-Cb transformation component value, the corresponding G-in-Cb transformation component value and the corresponding B-in-Cb transformation component value are added to obtain the digitized Cb component. The corresponding R-in-Cr transformation component value, the corresponding G-in-Cr transformation component value and the corresponding B-in-Cr transformation component value are added to obtain the digitized Cr component.

In another aspect of the present invention, a method for converting digitized YCbCr color components to digitized RGB color components includes the steps of: providing a color lookup table means which has a plurality of address inputs and which includes a first segment provided with a digitized transformation component value corresponding to a Cb-in-G component, a second segment provided with a digitized transformation component value corresponding to a Cb-in-B component, a third segment provided with a digitized transformation component value corresponding to a Cr-in-R component, and a fourth segment provided with a digitized transformation component value corresponding to a Cr-in-G component; inputting the digitized Y, Cb and Cr components to the address inputs of the color lookup table means to effect reference to the corresponding Cb-in-G transformation component value, the corresponding Cb-in-B transformation component value, the corresponding Cr-in-R transformation component value and the corresponding Cr-in-G transformation component value; adding the Y component and the corresponding Cr-in-R transformation component value to obtain the digitized R component; adding the Y component, the corresponding Cb-in-G transformation component value and the corresponding Cr-in-G transformation component value to obtain the digitized G component; and adding the Y component and the corresponding Cb-in-B transformation component value to obtain the digitized B component.

BRIEF DESCRIPTION OF THE DRAWINGS

Other features and advantages of the present invention will become apparent in the following detailed description of the preferred embodiments, with reference to the accompanying drawings, of which.

DESCRIPTION OF THE PREFERRED EMBODIMENT

In the present invention, each of the digitized Y, Cb and Cr components and each of the digitized R, G and B components is an 8-bit component. Direct conversion of digitized RGB components to digitized YCbCr components is achieved in the following manner:

$$\begin{vmatrix} Y \\ Cb \\ Cr \end{vmatrix} = \begin{vmatrix} 0.229 & 0.587 & 0.114 \\ -0.173 & -0.338 & 0.511 \\ 0.511 & -0.428 & -0.083 \end{vmatrix} \begin{vmatrix} R-128 \\ G-128 \\ B-128 \end{vmatrix} + \begin{vmatrix} 128 \\ 128 \\ 128 \end{vmatrix} \quad (a)$$

Direct conversion of digitized YCbCr components to RGB components is achieved in the following manner:

$$\begin{vmatrix} R \\ G \\ B \end{vmatrix} = \begin{vmatrix} 1 & -0.001 & 1.370 \\ 1 & -0.336 & -0.698 \\ 1 & 1.733 & 0.001 \end{vmatrix} \begin{vmatrix} Y-128 \\ Cb-128 \\ Cr-128 \end{vmatrix} + \begin{vmatrix} 128 \\ 128 \\ 128 \end{vmatrix} \quad (b)$$

The above conversions (a) and (b) can be represented by the following equation:

$$POn = \sum_{m=1}^{3} Cnm(PIm\text{-}128) + 128, n = 1, 2, 3 \quad (c)$$

In the equation (c), PIm is defined as a color component of an original space, POn is defined as a color component of a converted space, and Cnm is defined as a transformation coefficient corresponding to an nth color component of the converted space relative to an mth color component of the original space, and the product of Cnm and PIm-128 is defined as a transformation component value corresponding to a PIm-in-POn component. Therefore, in the present embodiment, when PO1, PO2 and PO3 represent Y, Cb and Cr components respectively, PI1, PI2 and PI3 represent R, G and B components respectively. Similarly, when PO1, PO2 and PO3 represent R, G and B components respectively, PI1, PI2 and PI3 represent Y, Cb and Cr components respectively.

Referring to FIGS. 1A, 1B, 1C, 2 and 3, an apparatus for performing color space conversion between digitized YCbCr color components and digitized RGB color components in accordance with a first embodiment of the present invention includes a programmable color lookup table means 1, first to third complement means 21 to 23, first to ninth polarity control means 31 to 39, first to third adder means and first to third compensation and limit circuits 51 to 53.

Figure 5:
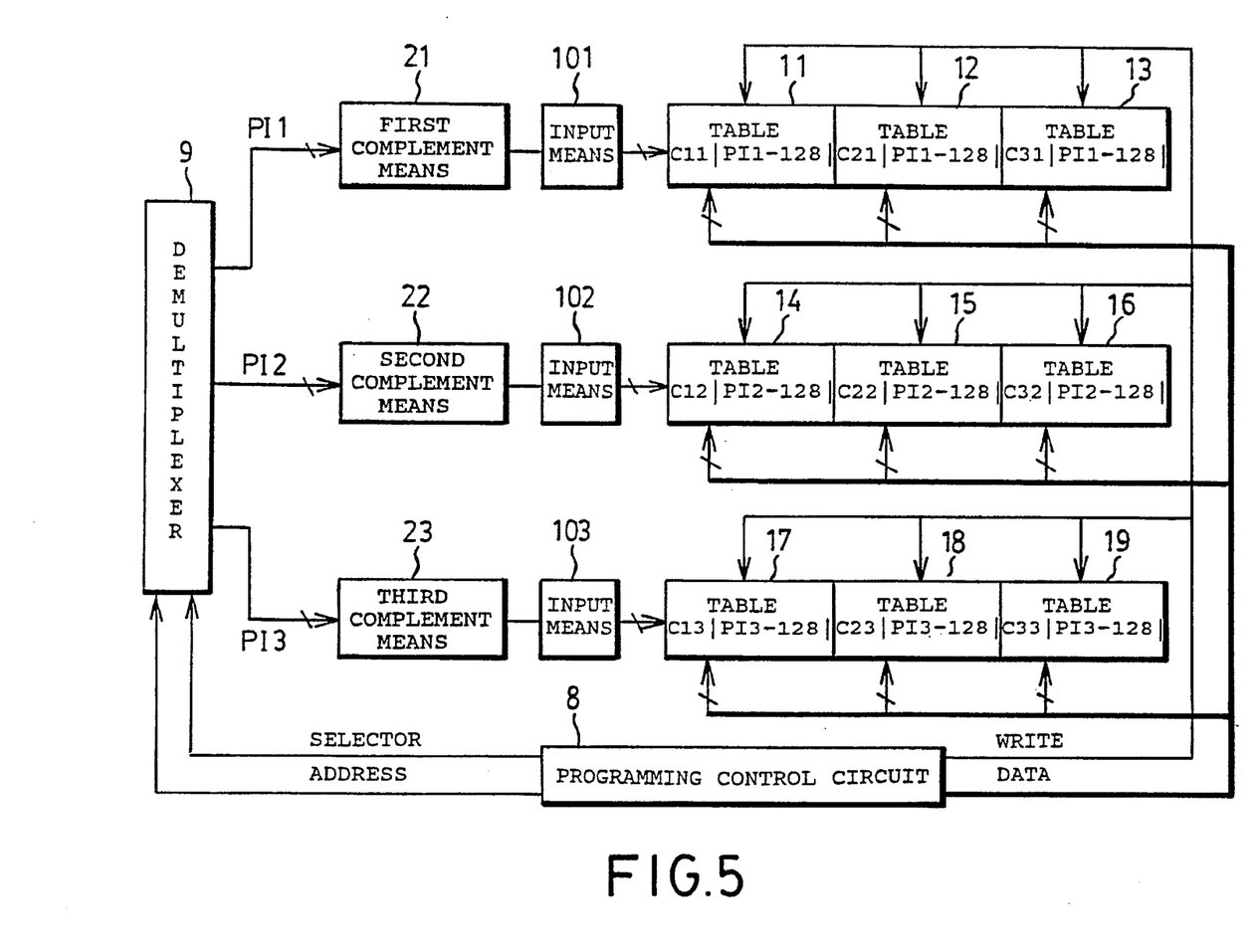
FIG. 5 is a schematic block diagram showing how a programmable color lookup table means of the apparatus shown in FIG. 1 is programmed.
Figure 6:
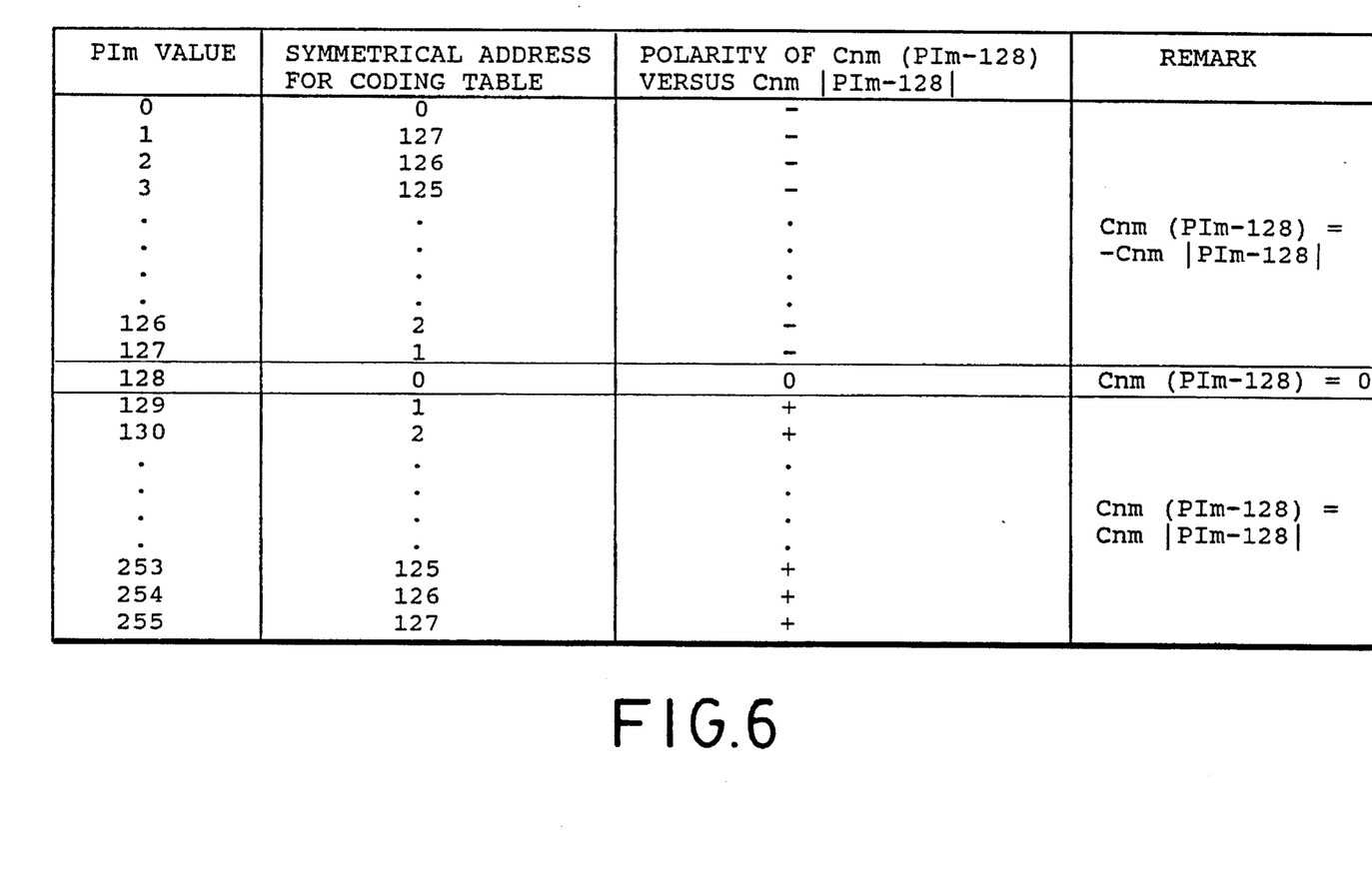
FIG. 6 is a table illustrating an address decoding method employed in the present invention.
Figure 7:
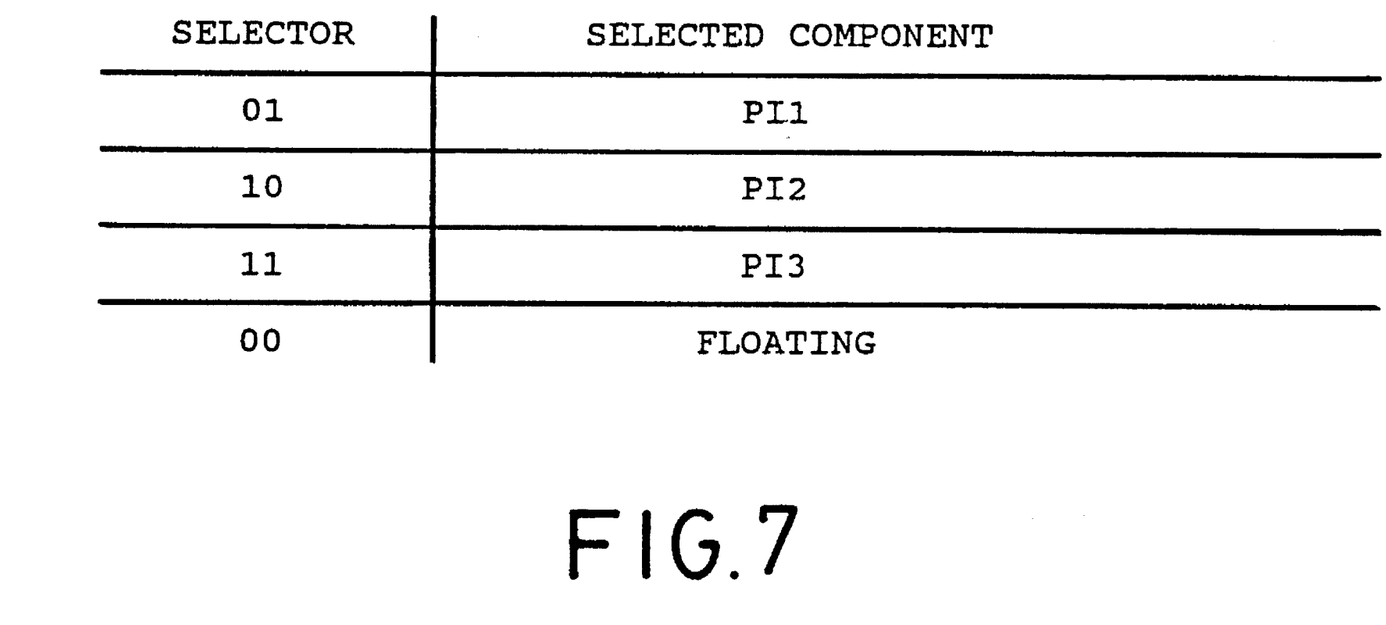
FIG. 7 illustrates the operation of a programming control circuit upon input of differing combinations of selecting signals, which programming control circuit is used to program the programmable color lookup table means of the apparatus shown in FIG. 1.

In the present embodiment, the programmable color lookup table means 1 is a RAM device. The lookup table means 1 has a plurality of address inputs and includes first to ninth segments 11 to 19, and input means 101, 102 and 103. The input means 101, 102 and 103 receive digitized PI1, PI2 and PI3 for addressing the address inputs of the lookup table means 1. In the present embodiment, each of the input means 101, 102, 103 is an address decoder. When converting the RGB components to the YCbCr components, the digitized transformation component values corresponding to an R-in-Y component, an R-in-Cb component, an R-in-Cr component, a G-in-Y component, a G-in-Cb component, a G-in-Cr component, a B-in-Y component, a B-in-Cb component and a B-in-Cr component are programmed into the first to ninth segments 11 to 19, respectively, based on the conversion (a). As best shown in FIGS. 5 and 7, the programming of the lookup table means 1 is accomplished by a programming control circuit 8 and a demultiplexer 9. The demultiplexer 9 is connected to the first, second and third complement means 21 to 23. The programming control circuit 8 has a WRITE signal line and a DATA bus that are connected to the first to ninth segments 11 to 19 of the lookup table means 1. The control circuit 8 further has a SELECTOR signal line and a ADDRESS signal line that are connected to the demultiplexer 9. The control circuit provides a 2-bit selecting signal to the demultiplexer 9 via the SELECTOR signal line. When the selecting signal is 01, the first to third segments 11 to 13 are selected to be programmed. When the selecting signal is 10, the fourth to sixth segments 14 to 16 are selected to be programmed. When the selecting signal is 11, the seventh to ninth segments 17 to 19 are selected to be programmed. When the selecting signal is 00, programming of the lookup table means 1 is prohibited. Since the segments 11 to 19 of the lookup table means 1 corresponding to the same component of the original space are written thereinto simultaneously, programming of the entire lookup table means 1 requires only 3*128=384 write cycles. When converting the YCbCr components to the RGB components, the digitized transformation component values corresponding to a Y-in-R component, a Y-in-G component, a Y-in-B component, a Cb-in-R component, a Cb-in-G component, a Cb-in-B component, a Cr-in-R component, a Cr-in-G component and a Cr-in-B component are programmed into the first to ninth segments 11 to 19, respectively, based on the conversion (b) by a similar programming procedure as described above.

It should be recognized that the conversion from digitized YCbCr components to digitized RGB components is similar to the conversion from digitized RGB components to digitized YCbCr components. Therefore, the following description of the first embodiment of the present invention is based on the conversion from digitized RGB components to digitized YCbCr components only.

Figure 1A:
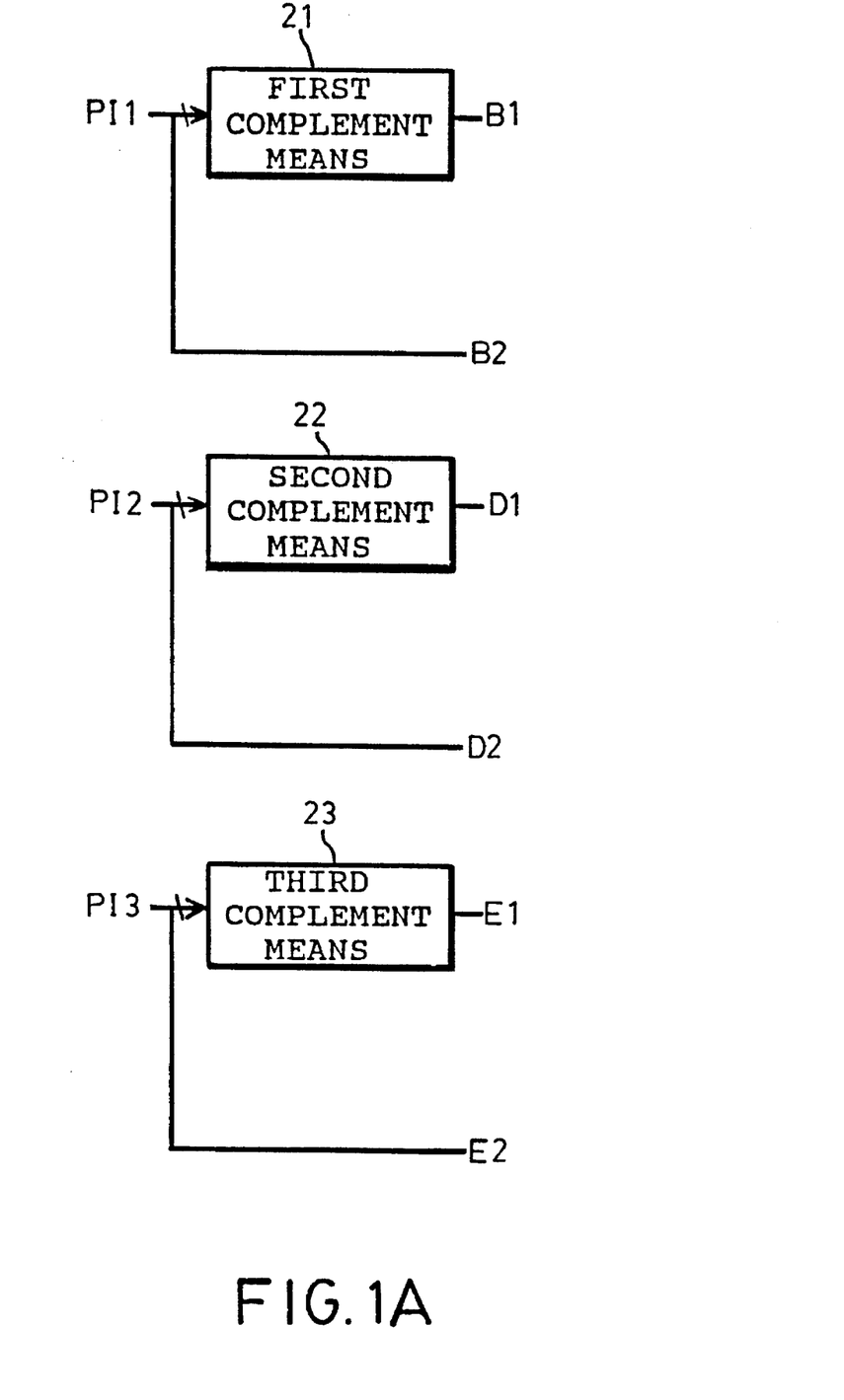
FIGS. 1A, 1B and 1C are schematic block diagrams showing an apparatus for performing color space conversion between digitized YCbCr color components and digitized RGB color components in accordance with a first embodiment of the present invention.
Figure 2:
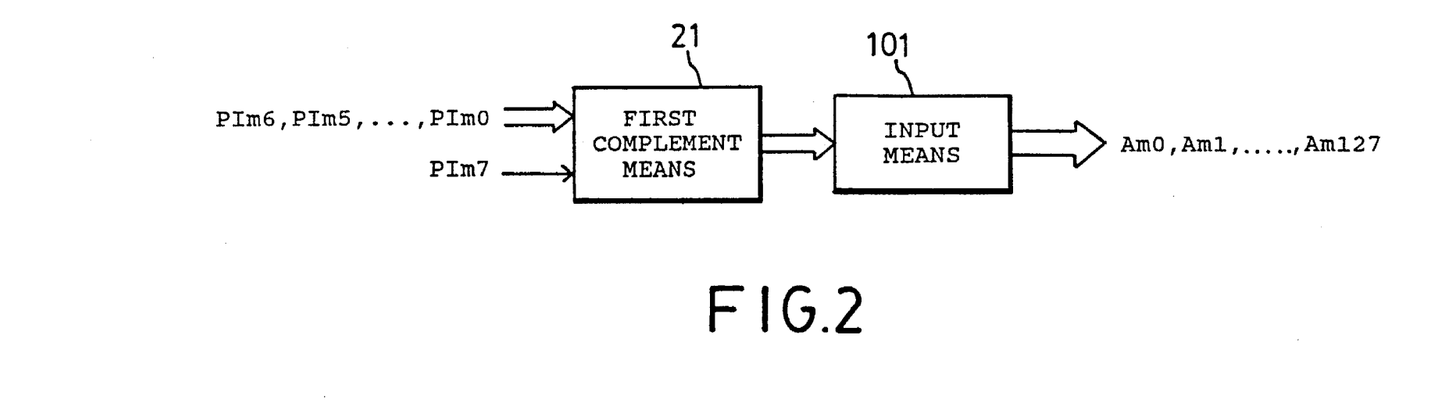
FIG. 2 is a schematic block diagram showing a first complement means and an address decoder of the apparatus of FIG. 1.

The first complement means 21 is connected to the input means 101 and receives the digitized R color component. The first complement means 21 generates 2's complement of the seven lower bits (PIm6 to PIm0) of the R color component when the most significant bit (PIm7) of the R color component is equal to 0.

The second complement means 22 is connected to the input means 102 and receives the digitized G color component. The second complement means 22 generates 2's complement of the seven lower bits of the G color component when the most significant bit of the G color component is equal to 0.

The third complement means 23 is connected to the input means 103 and receives the digitized B color component. The third complement means 23 generates 2's complement of the seven lower bits of the B color component when the most significant bit of the B color component is equal to O.

Figure 3:
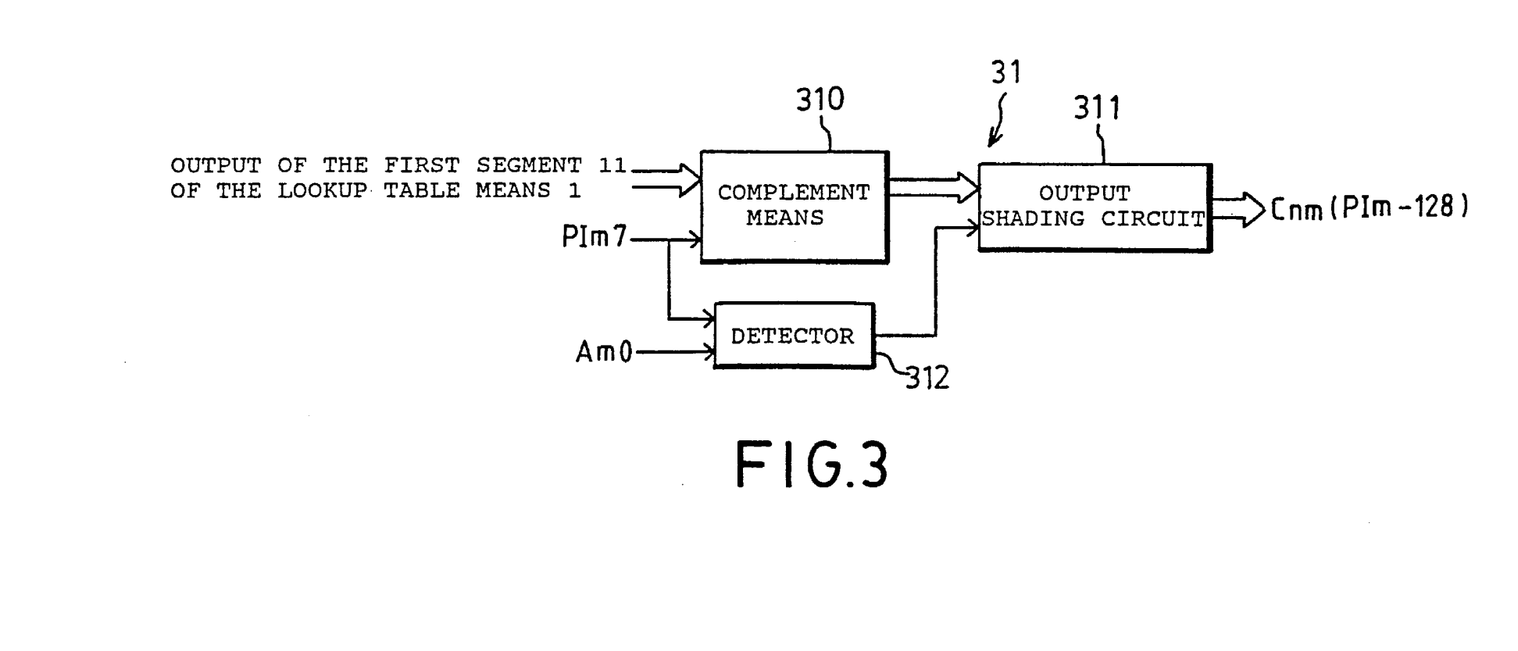
FIG. 3 is a schematic block diagram illustrating one of the polarity control means shown in FIG. 1.

The first polarity control means 31 includes a complement means 310 connected to an output of the first segment 11 of the lookup table means 1, an output shading circuit 311 connected to the complement means 310 and a detector 312. The complement means 310 generates 2's complement of the output of the first segment 11 of the lookup table means 1 when the most significant bit (PIm7) of the digitized R color component is equal to 0. The detector 312 detects whether the value of the digitized R component is 128 by means of an address signal (Am0) from the input means 101 and the most significant bit (PIm7) of the R component. The detector 312 generates a disabling signal when the value of the R component is 128. The shading circuit 311 outputs a value of O upon reception of the disabling signal from the detector 312. Otherwise, the shading circuit 311 outputs the output of the complement means 310.

The structure of the second polarity control means 32 is similar to that of the first polarity control means 31. The complement means (not shown) of the control means 32 is connected to an output of the second segment 12 of the lookup table means 1. The output shading circuit (not shown) of the control means 32 is connected to the complement means. The complement means generates 2's complement of the output of the second segment 12 of the lookup table means 1 when the most significant bit of the digitized R color component is equal to 0. The detector (not shown) of the control means 32 detects whether the value of the digitized R component is 128 by means of the address signal from the input means 101 and the most significant bit of the R component. The detector of the control means 32 generates a disabling signal when the value of the R component is 128. The shading circuit of the control means 32 outputs a value of O upon reception of the disabling signal from the detector. Otherwise, the shading circuit outputs the output of the complement means.

The structure of the third polarity control means 33 is similar to that of the first polarity control means 31. The complement means (not shown) of the control means 33 is connected to an output of the third segment 13 of the lookup table means 1. The output shading circuit (not shown) is connected to the complement means. The complement means generates 2's complement of the output of the third segment 13 of the lookup table means 1 when the most significant bit of the digitized R color component is equal to 0. The detector (not shown) of the control means 33 detects whether the value of the digitized R component is 128 by means of the address signal from the input means 101 and the most significant bit of the R component. The detector generates a disabling signal when the value of the R component is 128. The shading circuit outputs a value of O upon reception of the disabling signal from the detector. Otherwise, the shading circuit outputs the output of the complement means.

The structure of the fourth polarity control means 34 is similar to that of the first polarity control means 31. The complement means (not shown) of the control means 34 is connected to an output of the fourth segment 14 of the lookup table means 1. The output shading circuit (not shown) of the control means 34 is connected to the complement means. The complement means generates 2's complement of the output of the fourth segment 14 of the lookup table means 1 when the most significant bit of the digitized G color component is equal to 0. The detector (not shown) of the control means 34 detects whether the value of the digitized G component is 128 by means of an address signal from the input means 102 and the most significant bit of the G component. The detector generates a disabling signal when the value of the G component is 128. The shading circuit outputs a value of O upon reception of the disabling signal from the detector. Otherwise, the shading circuit outputs the output of the complement means.

The structure of the fifth polarity control means 35 is similar to that of the first polarity control means 31. The complement means (not shown) of the control means 35 is connected to an output of the fifth segment 15 of the lookup table means 1. The output shading circuit (not shown) of the control means 35 is connected to the complement means. The complement means generates 2's complement of the output of the fifth segment 15 of the lookup table means 1 when the most significant bit of the digitized G color component is equal to 0. The detector (not shown) of the control means 35 detects whether the value of the digitized G component is 128 by means of the address signal from the input means 102 and the most significant bit of the G component. The detector generates a disabling signal when the value of the G component is 128. The shading circuit outputs a value of O upon reception of the disabling signal from the control means 35. Otherwise, the shading circuit outputs the output of the complement means.

The structure of the sixth polarity control means 36 is similar to that of the first polarity control means 31. The complement means (not shown) of the control means 36 is connected to an output of the sixth segment 16 of the lookup table means 1. The output shading circuit (not shown) of the control means 36 is connected to the complement means. The complement means generates 2's complement of the output of the sixth segment 16 of the lookup table means 1 when the most significant bit of the digitized G color component is equal to 0. The detector (not shown) of the control means 36 detects whether the value of the digitized G component is 128 by means of the address signal from the input means 102 and the most significant bit of the G component. The detector generates a disabling signal when the value of the G component is 128. The shading circuit outputs a value of O upon reception of the disabling signal from the detector. Otherwise, the shading circuit outputs the output of the complement means.

The structure of the seventh polarity control means 37 is similar to that of the first polarity control means 31. The complement means (not shown) of the control means 37 is connected to an output of the seventh segment 17 of the lookup table means 1. The output shading circuit (not shown) of the control means 37 is connected to the complement means. The complement means generates 2's complement of the output of the seventh segment 17 of the lookup table means 1 when the most significant bit of the digitized B color component is equal to 0. The detector (not shown) of the control means 37 detects whether the value of the digitized B component is 128 by means of an address signal from the input means 103 and the most significant bit of the B component. The detector generates a disabling signal when the value of the B component is 128. The shading circuit outputs a value of O upon reception of the disabling signal from the detector. Otherwise, the shading circuit outputs the output of the complement means.

The structure of the eighth polarity control means 38 is similar to that of the first polarity control means 31. The complement means (not shown) of the control means 38 is connected to an output of the eighth segment 18 of the lookup table means 1. The output shading circuit (not shown) of the control means 38 is connected to the complement means. The complement means generates 2's complement of the output of the eighth segment 18 of the lookup table means 1 when the most significant bit of the digitized B color component is equal to 0. The detector (not shown) of the control means 38 detects whether the value of the digitized B component is 128 by means of the address signal from the input means 103 and the most significant bit of the B component. The detector generates a disabling signal when the value of the B component is 128. The shading circuit outputs a value of O upon reception of the disabling signal from the detector. Otherwise, the shading circuit outputs the output of the complement means.

The structure of the ninth polarity control means 39 is similar to that of the first polarity control means 31. The complement means (not shown) of the control means 39 is connected to an output of the ninth segment 19 of the lookup table means 1. The output shading circuit (not shown) of the control means 39 is connected to the complement means. The complement means generates 2's complement of the output of the ninth segment 19 of the lookup table means 1 when the most significant bit of the digitized B color component is equal to 0. The detector (not shown) of the control means 39 detects whether the value of the digitized B component is 128 by means of the address signal from the input means 103 and the most significant bit of the B component. The detector generates a disabling signal when the value of the B component is 128. The shading circuit outputs a value of O upon reception of the disabling signal from the detector. Otherwise, the shading circuit outputs the output of the complement means.

Figure 1B:
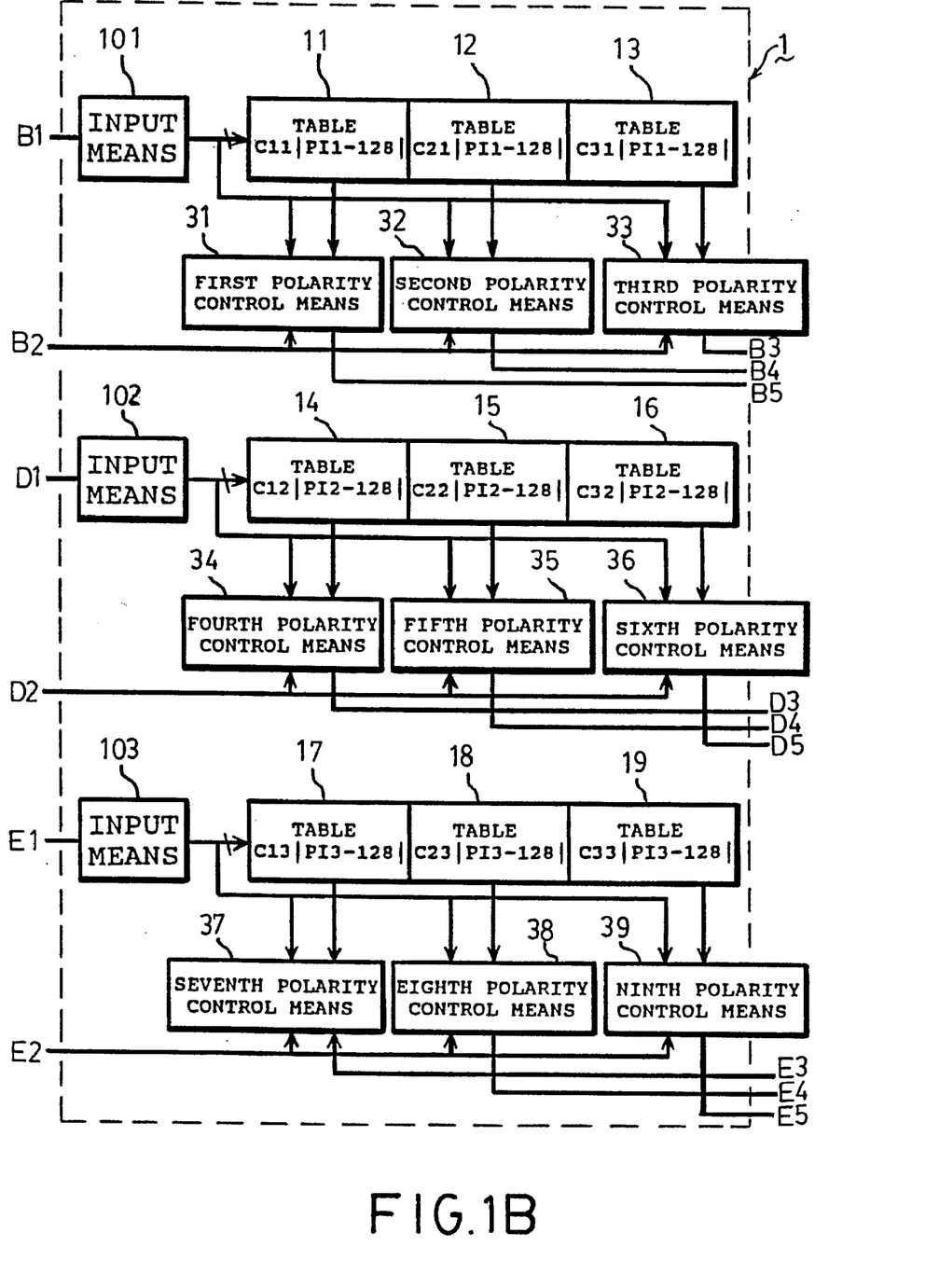
Figure 1C:
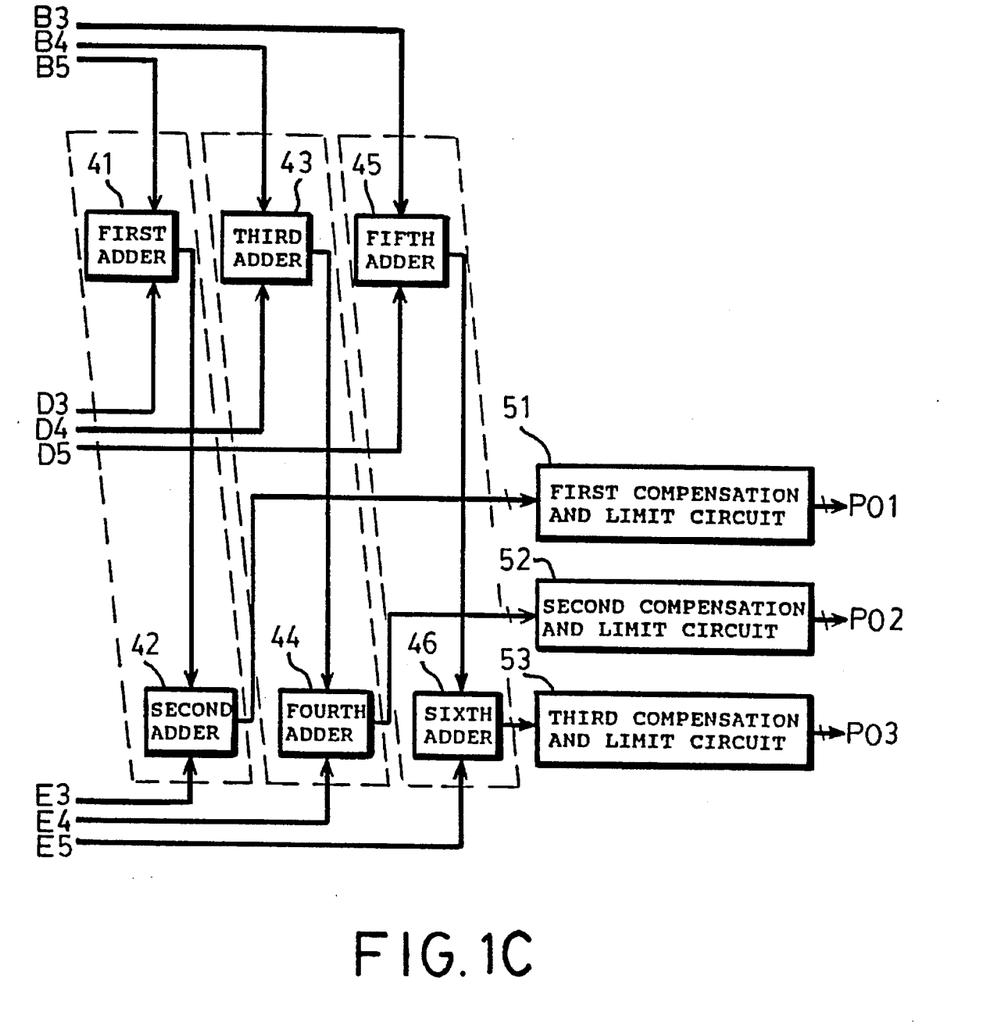

The first adder means includes a first adder 41 and a second adder 42. The first adder 41 is connected to the output shading circuit 311 of the first output polarity control means 31 and to the output shading circuit of the fourth output polarity control means 34 so as to generate an output corresponding to the sum of an output of the shading circuit 311 of the first output polarity control means 31 and an output of the shading circuit of the fourth output polarity control means 34. The second adder 42 is connected to the output shading circuit of the seventh output polarity control means 37 and to the first adder 41 so as to generate an output corresponding to the sum of the output of the first adder 41 and an output of the seventh output polarity control means 37 in order to obtain the digitized Y component.

The second adder means includes a third adder 43 and a fourth adder 44. The third adder 43 is connected to the output shading circuit of the second output polarity control means 32 and to the output shading circuit of the fifth output polarity control means 35 so as to generate an output corresponding to the sum of an output of the second output polarity control means 32 and an output of the fifth output polarity control means 35. The fourth adder 44 is connected to the third adder 43 and to the output shading circuit of the eighth output polarity control means 38 so as to generate an output corresponding to the sum of the output of the third adder 43 and an output of the eighth output polarity control means 38 in order to obtain the digitized Cb component.

The third adder means includes a fifth adder 45 and a sixth adder 46. The fifth adder 45 is connected to the output shading circuit of the third output polarity control means 33 and to the output shading circuit of the sixth output polarity control means 36 so as to generate an output corresponding to the sum of an output of the third output polarity control means 33 and an output of the sixth output polarity control means 36. The sixth adder 46 is connected to the fifth adder 45 and to the output shading circuit of the ninth output polarity control means 39 so as to generate an output corresponding to the sum of the output of the fifth adder 45 and an output of the ninth output polarity control means 39 in order to obtain the digitized Cr component.

The first compensation and limit circuit 51 is connected to the second adder 42 of the first adder means so as to receive the digitized Y component. The first compensation and limit circuit 51 compensates a constant to the value of the Y component from the second adder 42 and limits the compensated value of the Y component to between 0 and 255. If the compensated value of the Y component exceeds 255, the circuit 51 limits the value to 255. If the compensated value of the Y component is negative, the circuit 51 limits the value to O.

The second compensation and limit circuit 52 is connected to the fourth adder 44 of the second adder means so as to receive the digitized Cb component. The second compensation and limit circuit 52 compensates a constant to the value of the Cb component from the fourth adder 44 and limits the compensated value of the Cb component to between 0 and 255. If the compensated value of the Cb component exceeds 255, the circuit 52 limits the value to 255. If the compensated value of the Cb component is negative, the circuit 52 limits the value to O.

The third compensation and limit circuit 53 is connected to the sixth adder 46 of the third adder means so as to receive the digitized Cr component. The third compensation and limit circuit 53 compensates a constant to the value of the Cr component from the sixth adder 46 and limits the compensated value of the Cr component to between 0 and 255. If the compensated value of the Cr component exceeds 255, the circuit 53 limits the value to 255. If the compensated value of the Cr component is negative, the circuit 53 limits the value to O. The first, second and third compensation and limit circuits 51, 52, 53 are designed to do level shifting and to prevent the occurrence of overflow.

Referring now to FIGS. 1A, 1B, 1C and 6, the reason for using the first to third complement means 21 to 23 and the first to ninth output polarity control means 31 to 39 will be described hereinafter. Since the digitized color components in the present embodiment are 8-bit components, the PIm value thus ranges between 0 to 255. It can be seen that the 2's complement of a PIm value within the range of 1 to 127 is identical to a corresponding one of the PIm values within the range of 129 to 255. For example, the 2's complement of 1 is equal to 255, the 2's complement of 2 is equal to 254, and so on. It is noted that when the conversions (a) and (b) are used, the absolute values of the transformation component values corresponding to the PIm values of 1 and 255 are equal in magnitude but differ in polarity, those corresponding to the PIm values of 2 and 254 are equal in magnitude but differ in polarity, and so on. Therefore, the PIm value of 1 and 255 can refer to the same address, the PIm value of 2 and 254 can also refer to the same address, and so on. The PIm value of 128 can refer to an address in which the PIm value of O is encoded, thereby minimizing the memory requirements of the lookup table means 1 to $9*2^7*8$ bits= 1.125 K bytes. The first to third complement means 21 to 23 are used to generate and transmit the 2's complement of a PIm value ranging between 0 and 127 into the address inputs of the lookup table means 1 to effect reference to the corresponding transformation component value. The output polarity control means 31 to 39 are used to invert the polarity of the corresponding transformation component value when the PIm value ranges between 0 and 127.

It should be appreciated that the first embodiment of the present invention is operable even when the first to third complement means 21 to 23 and the first to ninth output polarity control means 31 to 39 are not employed. When the first to third complement means 21 to 23 and the output polarity control means 31 to 39 are not in use, the transformation component values are programmed into the first to ninth segments 11 to 19 of the lookup table means 1 based on the following conversion $$\begin{vmatrix} Y \\ Cb \\ Cr \end{vmatrix} = \begin{vmatrix} 0.229 & 0.587 & 0.114 \\ -0.173 & -0.338 & 0.511 \\ 0.511 & -0.428 & -0.083 \end{vmatrix} \begin{vmatrix} R \\ G \\ B \end{vmatrix} + \begin{vmatrix} 0 \\ 128 \\ 128 \end{vmatrix} \quad (d)$$

when converting RGB components to YCbCr components, and based on the following conversion $$\begin{vmatrix} R \\ G \\ B \end{vmatrix} = \begin{vmatrix} 1 & -0.001 & 1.370 \\ 1 & -0.336 & -0.698 \\ 1 & 1.733 & 0.001 \end{vmatrix} \begin{vmatrix} Y \\ Cb \\ Cr \end{vmatrix} + \begin{vmatrix} -175 \\ 132 \\ -222 \end{vmatrix} \quad (e)$$

when converting YCbCr components to RGB components. Although the memory requirement is larger, that is $9*2^8*8$ bits =2.25 k bytes, it is still smaller when compared to the known color space conversion techniques.

Figure 4:
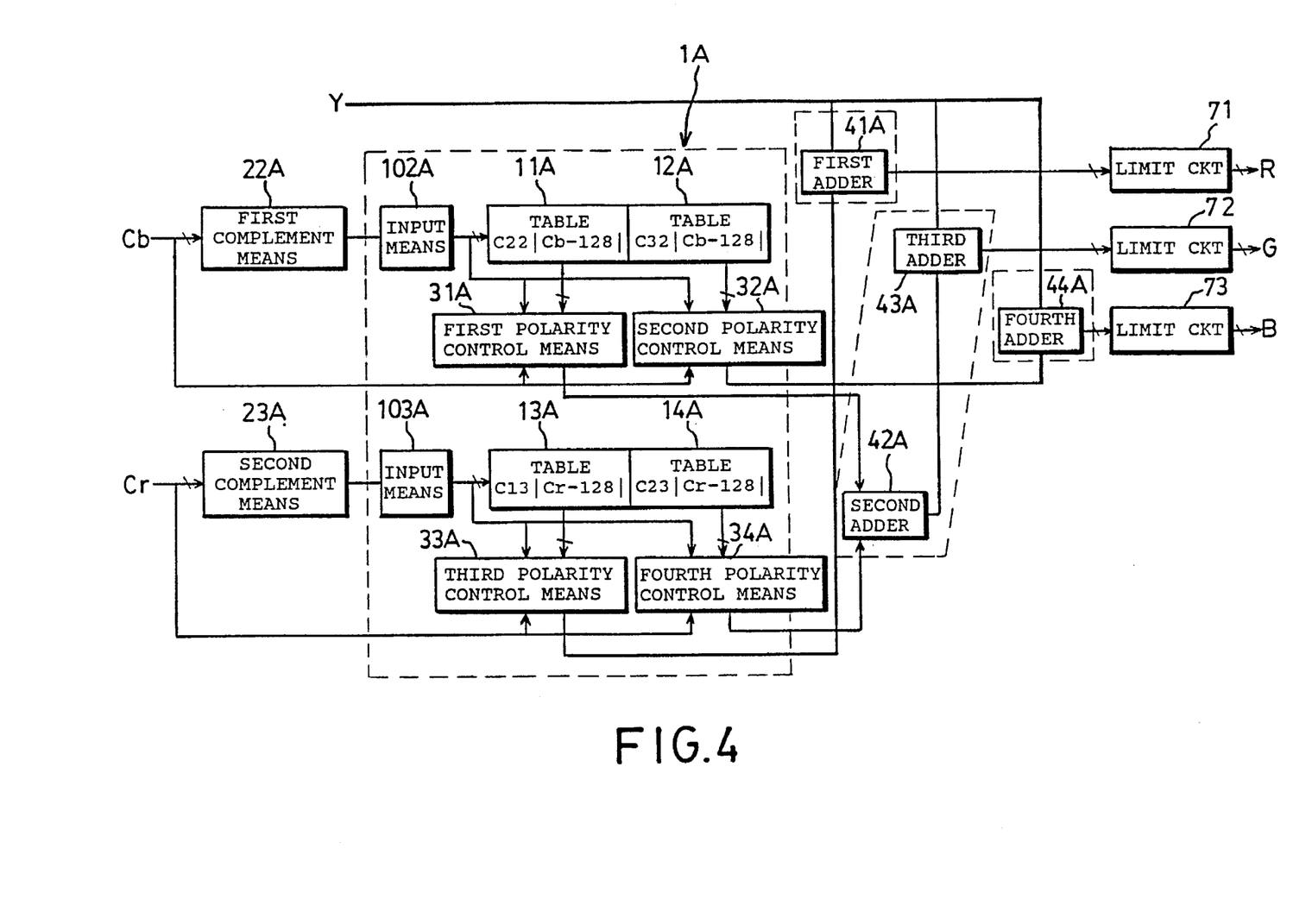
FIG. 4 is a schematic block diagram of an apparatus for converting digitized YCbCr components to digitized RGB components in accordance with a second embodiment of the present invention.

Referring now to FIG. 4, a second embodiment of the present invention is shown. The second embodiment is used to convert YCbCr components to RGB components. From the conversion (e), since the transformation coefficients corresponding to the Y-in-R component, the Y-in-G component and the Y-in-B component are all equal to one, and since the transformation coefficients corresponding to the Cb-in-R component and the Cr-in-B component are both approximately equal to zero, a simplified lookup table means (1A), which has a plurality of address inputs and which includes only first to fourth segments (11A to 14A), can thus be employed. In the present embodiment, the lookup table means (1A) is a ROM device and further includes input means (102A, 103A) to receive digitized Cb and Cr components for addressing the address inputs thereof. The transformation component values corresponding to the Cb-in-G, the Cb-in-B, the Cr-in-R and the Cr-in-G components occupy the first to fourth segments (11A to 14A), respectively.

A first complement means (22A) is connected to the input means (102A) and receives the digitized Cb color component. The first complement means (22A) generates 2's complement of the seven lower bits of the Cb color component when the most significant bit of the Cb color component is equal to 0.

A second complement means (23A) is connected to the input means (103A) and receives the digitized Cr color component. The second complement means (23A) generates 2's complement of the seven lower bits of the Cr color component when the most significant bit of the Cr color component is equal to 0.

A first polarity control means (31A) is connected to the first segment (11A) of the lookup table means (1A) and receives the output of the first segment (11A). The first polarity control means (31A) outputs a value of O when the value of the digitized Cb component is 128. Otherwise, the first polarity control means (31A) generates and outputs 2's complement of the output of the first segment (11A) when the most significant bit of the Cb component is equal to 0, and outputs the output of the first segment (11A) when the most significant bit of the Cb component is equal to 1.

A second polarity control means (32A) is connected to the second segment (12A) of the lookup table means (1A) and receives the output of the second segment (12A). The second polarity control means (32A) outputs a value of O when the value of the digitized Cb component is 128. Otherwise, the second polarity control means (32A) generates and outputs 2's complement of the output of the second segment (12A) when the most significant bit of the Cb component is equal to 0, and outputs the output of the second segment (12A) when the most significant bit of the Cb component is equal to 1.

A third polarity control means (33A) is connected to the third segment (13A) of the lookup table means (1A) and receives the output of the third segment (13A). The third polarity control means (33A) outputs a value of O when the value of the digitized Cr component is 128. Otherwise, the third polarity control means (33A) generates and outputs 2's complement of the output of the third segment (13A) when the most significant bit of the Cr component is equal to 0, and outputs the output of the third segment (13A) when the most significant bit of the Cr component is equal to 1.

A fourth polarity control means (34A) is connected to the fourth segment (14A) of the lookup table means (1A) and receives the output of the fourth segment (14A). The fourth polarity control means (34A) outputs a value of O when the value of the digitized Cr component is 128. Otherwise, the

11 fourth polarity control means (34A) generates and output 2's complement of the output of the fourth segment (14A) when the most significant bit of the Cr component is equal to 0, and outputs the output of the fourth segment (14A) when the most significant bit of the Cr component is equal to 1.

A first adder means includes a first adder (41A) which generates an output corresponding to the sum of the Y component and an output of the third output polarity control means (33A) so as to obtain the digitized R component.

A second adder means includes a second adder (42A) and a third adder (43A). The second adder (42A) is connected to the first output polarity control means (31A) and to the fourth output polarity control means (34A) so as to generate an output corresponding to the sum of an output of the first output polarity control means (31A) and an output of the fourth output polarity control means (34A). The third adder (43A) is connected to the second adder (42A) and receives the Y component so as to generate an output corresponding to the sum of the Y component and the output of the second adder (42A) in order to obtain the digitized G component.

A third adder means includes a fourth adder (44A) which generates an output corresponding to the sum of the Y component and an output of the second output polarity control means (32A) so as to obtain the digitized B component.

A first limit circuit 71 is connected to the first adder (41A) so as to receive the digitized R component. The first limit circuit 71 limits the value of the R component to between 0 and 255. If the value of the R component exceeds 255, the circuit 71 limits the value to 255. If the value of the R component is negative, the circuit 71 limits the value to O.

A second limit circuit 72 is connected to the third adder (43A) so as to receive the digitized G component. The second limit circuit 72 limits the value of the G component to between 0 and 255. If the value of the G component exceeds 255, the circuit 72 limits the value to 255. If the value of the G component is negative, the circuit 72 limits the value to O.

A third limit circuit 73 is connected to the fourth adder (44A) so as to receive the digitized B component. The third limit circuit 73 limits the value of the B component to between 0 and 255. If the value of the B component exceeds 255, the circuit 73 limits the value to 255. If the value of the B component is negative, the circuit 73 limits the value to O.

Accordingly, the first embodiment of the present invention provides a method and apparatus for performing color space conversion between digitized YCbCr color components and digitized RGB color components by programming the programmable color lookup table means 1 with transformation component values based on the conversions (a) and (b). The memory requirements in the first embodiment is minimized to $9*2^7*8$ bits (1.125 K bytes) so that the cost is reduced. The second embodiment of the present invention provides an apparatus for converting digitized YCbCr components to digitized RGB components, which apparatus has a simplified structure so as to further minimize the memory requirements in order to further reduce the cost thereof.

While the present invention has been described in connection with what is considered the most practical and preferred embodiments, it is understood that this invention is not limited to the disclosed embodiments, but is intended to cover various arrangements included within the spirit and scope of the broadest interpretation so as to encompass all such modifications and equivalent arrangements.

I claim:

1. A method for converting digitized YCbCr color components to digitized RGB color components, said method comprising the steps of:

12

(i) providing a color lookup table means which has a plurality of address inputs and which includes a first segment provided with a digitized transformation component value corresponding to a Cb-in-G component, a second segment provided with a digitized transformation component value corresponding to a Cb-in-B component, a third segment provided with a digitized transformation component value corresponding to a Cr-in-R component, and a fourth segment provided with a digitized transformation component value corresponding to a Cr-in-G component;

generating 2's complement of said Cb color component when a most significant bit of the Cb color component is equal to 0, and generating 2's complement of said Cr color component when a most significant bit of the Cr color component is equal to 0, (ii) inputting said digitized Cb and Cr components to said address inputs of said color lookup table means to effect reference to corresponding said Cb-in-G transformation component value, corresponding said Cb-in-B transformation component value, corresponding said Cr-in-R transformation component value and corresponding said Cr-in-G transformation component value;

inversing polarities of said corresponding Cb-in-G transformation component value and said corresponding Cb-in-B transformation component value when said most significant bit of said Cb color component is equal to 0, and inversing polarities of said corresponding Cr-in-R transformation component value and said corresponding Cr-in-G transformation component value when said most significant bit of said Cr color component is equal to 0, each of the RGB color components and YCbCr color components being an 8-bit component, and said set of conversions being $$\begin{vmatrix} R \\ G \\ B \end{vmatrix} = \begin{vmatrix} 1 & -0.001 & 1.370 \\ 1 & -0.336 & -0.698 \\ 1 & 1.733 & 0.001 \end{vmatrix} \begin{vmatrix} Y\text{-}128 \\ Cb\text{-}128 \\ Cr\text{-}128 \end{vmatrix} + \begin{vmatrix} 128 \\ 128 \\ 128 \end{vmatrix}$$

(iii) adding said Y component and said corresponding Cr-in-R transformation component value to obtain the digitized R component;

(iv) adding said Y component, said corresponding Cb-in-G transformation component value and said corresponding Cr-in-G transformation component value to obtain the digitized G component; and (v) adding said Y component and said corresponding Cb-in-B transformation component value to obtain the digitized B component.

2. A method as claimed in claim 1, wherein said steps (iii), (iv) and (v) occur simultaneously.

3. A method for performing color space conversion between digitized RGB color components and digitized YCbCr color components, said method comprising the steps of:

(A) when converting said RGB color components to said YCbCr color components, (a1) providing a color lookup table means with digitized transformation component values corresponding to an R-in-Y component, a G-in-Y component, a B-in-Y component, an R-in-Cb component, a G-in-Cb component, a B-in-Cb component, an R-in-Cr component, a G-in-Cr component and a B-in-Cr component based on a set of conversions from individual digitized R, G and B components, said programmable color lookup table means having a plurality of address inputs and including first to ninth segments, said transformation component values corresponding to said R-in-Y component, said R-in-Cb component, said R-in-Cr component, said G-in-Y component, said G-in-Cb component, said G-in-Cr component, said B-in-Y component, said B-in-Cb component and said B-in-Cr component occupying said first to ninth segments, respectively;

generating 2's complement of said R color component when a most significant bit of the R color component is equal to 0, generating 2's complement of said G color component when a most significant bit of the G color component is equal to O and generating 2's complement of said B color component when a most significant bit of the B color component is equal to O, (a2) inputting said digitized R, G and B components to said address inputs of said color lookup table means to effect reference to corresponding said R-in-Y transformation component value, corresponding said G-in-Y transformation component value, corresponding said B-in-Y transformation component value, corresponding said R-in-Cb transformation component value, corresponding said G-in-Cb transformation component value, corresponding said B-in-Cb transformation component value, corresponding said R-in-Cr transformation component value, corresponding said G-in-Cr transformation component value and corresponding said B-in-Cr transformation component value;

inversing polarities of said corresponding R-in-Y transformation component value, said corresponding R-in-Cb transformation component value and said corresponding R-in-Cr transformation component value when said most significant bit of said R color component is equal to 0, inversing polarities of said corresponding G-in-Y transformation component value, said corresponding G-in-Cb transformation component value and said corresponding G-in-Cr transformation component value when said most significant bit of said G color component is equal to 0, and inversing polarities of said corresponding B-in-Y transformation component value, said corresponding B-in-Cb transformation component value and said corresponding B-in-Cr transformation component value when said most significant bit of said B color component is equal to 0, each of the RGB color components and YCbCr color components being an 8-bit component and said set of conversions used in said step (a1) being $$\begin{vmatrix} Y \\ Cb \\ Cr \end{vmatrix} = \begin{vmatrix} 0.229 & 0.587 & 0.114 \\ -0.173 & -0.338 & 0.511 \\ 0.511 & -0.428 & -0.083 \end{vmatrix} \begin{vmatrix} R\text{-}128 \\ G\text{-}128 \\ B\text{-}128 \end{vmatrix} + \begin{vmatrix} 128 \\ 128 \\ 128 \end{vmatrix}$$

(a3) adding said corresponding R-in-Y transformation component value, said corresponding G-in-Y transformation component value and said corresponding B-in-Y transformation component value to obtain the digitized Y component;

(a4) adding said corresponding R-in-Cb transformation component value, said corresponding G-in-Cb transformation component value and said corresponding B-in-Cb transformation component value to obtain the digitized Cb component; and (a5) adding said corresponding R-in-Cr transformation component value, said corresponding G-in-Cr transformation component value and said corresponding B-in-Cr transformation component value to obtain the digitized Cr component.

4. A method as claimed in claim 3, wherein said steps (a3), (a4) and (a5) occur simultaneously.

5. A method as claimed in claim 4, further comprising the steps of:

(B) when converting said YCbCr color components to said RGB color components, (b1) providing said color lookup table means with digitized transformation component values corresponding to a Y-in-R component, a Cb-in-R component, a Cr-in-R component, a Y-in-G component, a Cb-in-G component, a Cr-in-G component, a Y-in-B component, a Cb-in-B component and a Cr-in-B component based on a set of conversions from individual digitized Y, Cb and Cr components, said transformation component value corresponding to said Y-in-R component, said Y-in-G component, said Y-in-B component, said Cb-in-R component, said Cb-in-G component, said Cb-in-B component, said Cr-in-R component, said Cr-in-G component and said Cr-in-B component occupying said first to ninth segments, respectively;

(b2) inputting said digitized Y, Cb and Cr components to said address inputs of said color lookup table means to effect reference to corresponding said Y-in-R transformation component value, corresponding said Cb-in-R transformation component value, corresponding said Cr-in-R transformation component value, corresponding said Y-in-G transformation component value, corresponding said Cb-in-G transformation component value, corresponding said Cr-in-G transformation component value, corresponding said Y-in-B transformation component value, corresponding said Cb-in-B transformation component value and corresponding said Cr-in-B transformation component value;

(b3) adding said corresponding Y-in-R transformation component value, said corresponding Cb-in-R transformation component value and said corresponding Cr-in-R transformation component value to obtain the digitized R component;

(b4) adding said corresponding Y-in-G transformation component value, said corresponding Cb-in-G transformation component value and said corresponding Cr-in-G transformation component value to obtain the digitized G component; and (b5) adding said corresponding Y-in-B transformation component value, said corresponding Cb-in-B transformation component value and said corresponding Cr-in-B transformation component value to obtain the digitized B component.

6. A method as claimed in claim 5, wherein said steps (b3), (b4) and (b5) occur simultaneously.

7. A method as claimed in claim 5, wherein said set of conversions used in said step (b1) is $$\begin{vmatrix} R \\ G \\ B \end{vmatrix} = \begin{vmatrix} 1 & -0.001 & 1.370 \\ 1 & -0.336 & -0.698 \\ 1 & 1.733 & 0.001 \end{vmatrix} \begin{vmatrix} Y \\ Cb \\ Cr \end{vmatrix} + \begin{vmatrix} -175 \\ 132 \\ -222 \end{vmatrix} .$$

8. A method for performing color space conversion between digitized RGB color components and digitized YCbCr color components, said method comprising the steps of:

(A) when converting said RGB color components to said YCbCr color components, (a1) providing a Color lookup table means with digitized transformation component values corresponding to an R-in-Y component, a G-in-Y component, a B-in-Y component, an R-in-Cb component, a G-in-Cb component, a B-in-Cb component, an R-in-Cr component, a G-in-Cr component and a B-in-Cr component based on a set of conversions from individual digitized R, G and B components, said programmable color lookup table means having a plurality of address inputs and including first to ninth segments, said transformation component values corresponding to said R-in-Y component, said R-in-Cb component, said R-in-Cr component, said G-in-Y component, said G-in-Cb component, said G-in-Cr component, said B-in-Y component, said B-in-Cb component and said B-in-Cr component occupying said first to ninth segments, respectively;

(a2) inputting said digitized R, G and B components to said address inputs of said color lookup table means to effect reference to corresponding said R-in-Y transformation component value, corresponding said G-in-Y transformation component value, corresponding said B-in-Y transformation component value, corresponding said R-in-Cb transformation component value, corresponding said G-in-Cb transformation component value, corresponding said B-in-Cb transformation component value, corresponding said R-in-Cr transformation component value, corresponding said G-in-Cr transformation component value and corresponding said B-in-Cr transformation component value;

(a3) adding said corresponding R-in-Y transformation component value, said corresponding G-in-Y transformation component value and said corresponding B-in-Y transformation component value to obtain the digitized Y component;

(a4) adding said corresponding R-in-Cb transformation component value, said corresponding G-in-Cb transformation component value and said corresponding B-in-Cb transformation component value to obtain the digitized Cb component;

(a5) adding said corresponding R-in-Cr transformation component value, said corresponding G-in-Cr transformation component value and said corresponding B-in-Cr transformation component value to obtain the digitized Cr component;

(B) when converting said YCbCr color components to said RGB color components, (b1) providing said color lookup table means with digitized transformation component values corresponding to a Y-in-R component, a Cb-in-R component, a Cr-in-R component, a Y-in-G component, a Cb-in-G component, a Cr-in-G component, a Y-in-B component, a Cb-in-B component and a Cr-in-B component based on a set of conversions from individual digitized Y, Cb and Cr components, said transformation component value corresponding to said Y-in-R component, said Y-in-G component, said Y-in-B component, said Cb-in-R component, said Cb-in-G component, said Cb-in-B component, said Cr-in-R component, said Cr-in-G component and said Cr-in-B component occupying said first to ninth segments, respectively;

generating 2's complement of said Y color component when a most significant bit of the Y color component is equal to 0, generating 2's complement of said Cb color component when a most significant bit of the Cb color component is equal to 0 and generating 2's complement of said Cr color component when a most significant bit of the Cr color component is equal to 0, (b2) inputting said digitized Y, Cb and Cr components to said address inputs of said color lookup table means to effect reference to corresponding said Y-in-R transformation component value, corresponding said Cb-in-R transformation component value, corresponding said Cr-in-R transformation component value, corresponding said Y-in-G transformation component value, corresponding said Cb-in-G transformation component value, corresponding said Cr-in-G transformation component value, corresponding said Y-in-B transformation component value, corresponding said Cb-in-B transformation component value and corresponding said Cr-in-B transformation component value;

inversing polarities of said corresponding Y-in-R transformation component value, said corresponding Y-in-G transformation component value and said corresponding Y-in-B transformation component value when said most significant bit of said Y color component is equal to 0, inversing polarities of said corresponding Cb-in-R transformation component value, said corresponding Cb-in-G transformation component value and said corresponding Cb-in-B transformation component value when said most significant bit of said Cb color component is equal to 0, and a step of inversing polarities of said corresponding Cr-in-R transformation component value, said corresponding Cr-in-G transformation component value and said corresponding Cr-in-B transformation component value when said most significant bit of said Cr color component is equal to 0, each of the RGB color components and YCbCr color components being an 8-bit component and said set of conversions used in said step (b1) being $$\begin{vmatrix} R \\ G \\ B \end{vmatrix} = \begin{vmatrix} 1 & -0.001 & 1.370 \\ 1 & -0.336 & -0.698 \\ 1 & 1.733 & 0.001 \end{vmatrix} \begin{vmatrix} Y-128 \\ Cb-128 \\ Cr-128 \end{vmatrix} + \begin{vmatrix} 128 \\ 128 \\ 128 \end{vmatrix}$$

(b3) adding said corresponding Y-in-R transformation component value, said corresponding Cb-in-R transformation component value and said corresponding Cr-in-R transformation component value to obtain the digitized R component;

(b4) adding said corresponding Y-in-G transformation component value, said corresponding Cb-in-G transformation component value and said corresponding Cr-in-G transformation component value to obtain the digitized G component; and (b5) adding said corresponding Y-in-B transformation component value, said corresponding Cb-in-B transformation component value and said corresponding Cr-in-B transformation component value to obtain the digitized B component.

9. An apparatus for converting digitized YCbCr color components to digitized RGB color components, said apparatus comprising:

color lookup table means which has a plurality of address inputs and which includes a first segment provided with a digitized transformation component value corresponding to a Cb-in-G component, a second segment provided with a digitized transformation component value corresponding to a Cb-in-B component, a third segment provided with a digitized transformation component value corresponding to a Cr-in-R component, and a fourth segment provided with a digitized transformation component value corresponding to a Cr-in-G component, said Cb-in-G, said Cb-in-B, said Cr-in-R and said Cr-in-G transformation component values being based on a set of conversions from individual digitized Y, Cb and Cr components, said lookup table means further including means for receiving the digitized Cb and Cr components and for addressing said address inputs of said lookup table means wherein each of the YCbCr color components and RGB color components is an 8-bit component and said set of conversions is $$\begin{vmatrix} R \\ G \\ B \end{vmatrix} = \begin{vmatrix} 1 & -0.001 & 1.370 \\ 1 & -0.336 & -0.698 \\ 1 & 1.733 & 0.001 \end{vmatrix} \begin{vmatrix} Y\text{-}128 \\ Cb\text{-}128 \\ Cr\text{-}128 \end{vmatrix} + \begin{vmatrix} 128 \\ 128 \\ 128 \end{vmatrix},$$

a first adder means for generating an output corresponding to the sum of said Y component and an output of said third segment of said lookup table means so as to obtain the digitized R component;

a second adder means for generating an output corresponding to the sum of said Y component, an output of said first segment of said lookup table means and an output of said fourth segment of said lookup table means so as to obtain the digitized G component;

a third adder means for generating an output corresponding to the sum of said Y component and an output of said second segment of said lookup table means so as to obtain the digitized B component;

a first complement means coupled to said address inputs of said lookup table means, said first complement means receiving said digitized Cb color component and generating 2's complement of said Cb color component when a most significant bit of the Cb color component is equal to 0;

a second complement means coupled to said address inputs of said lookup table means, said second complement means receiving said digitized Cr color component and generating 2's complement of said Cr color component when a most significant bit of the Cr color component is equal to 0;

a first polarity control means interconnecting said first segment of said lookup table means and said second adder means for inversing polarity of said corresponding Cb-in-G transformation component value from said first segment of said lookup table means when said most significant bit of said Cb color component is equal to 0;

a second polarity control means interconnecting said second segment of said lookup table means and said third adder means for inversing polarity of said corresponding Cb-in-B transformation component value from said second segment of said lookup table means when said most significant bit of said Cb color component is equal to 0;

a third polarity control means interconnecting said third segment of said lookup table means and said first adder means for inversing polarity of said corresponding Cr-in-R transformation component value from said third segment of said lookup table means when said most significant bit of said Cr color component is equal to 0; and a fourth polarity control means interconnecting said fourth segment of said lookup table means and said second adder means for inversing polarity of said corresponding Cr-in-G transformation component value from said fourth segment of said lookup table means when said most significant bit of said Cr color component is equal to 0.

10. An apparatus for converting digitized RGB color components to digitized YCbCr color components, said apparatus, comprising:

color lookup table means for storing digitized transformation component an R-in-Cb component, a G-in-Cb component, a B-in-Cb component, an R-in-Cr values corresponding to an R-in-Y component, a G-in-Y component, a B-in-Y component, component, a G-in-Cr component and a B-in-Cr component based on a set of conversions from individual digitized R, G and B components, said color lookup table means having a plurality of address inputs and including first to ninth segments, said transformation component values corresponding to said R-in-Y component, said R-in-Cb component, said R-in-Cr component, said G-in-Y component, said G-in-Cb component, said G-in-Cr component, said B-in-Y component, said B-in-Cb component and said B-in-Cr component occupying said first to ninth segments, respectively, said lookup table means further including means to receive the digitized R, G and B components for addressing said address inputs of said lookup table means, wherein said RGB color components are 8-bit components, said set of conversions being $$\begin{vmatrix} Y \\ Cb \\ Cr \end{vmatrix} = \begin{vmatrix} 0.229 & 0.587 & 0.114 \\ -0.173 & -0.338 & 0.511 \\ 0.511 & -0.428 & -0.083 \end{vmatrix} \begin{vmatrix} R\text{-}128 \\ G\text{-}128 \\ B\text{-}128 \end{vmatrix} + \begin{vmatrix} 128 \\ 128 \\ 128 \end{vmatrix},$$

a first adder means for generating an output corresponding to the sum of an output of said first segment of said lookup table means, an output of said fourth segment of said lookup table means and an output of said seventh segment of said lookup table means so as to obtain the digitized Y component;

a second adder means for generating an output corresponding to the sum of an output of said second segment of said lookup table means, an output of said fifth segment of said lookup table means and an output of said eighth segment of said lookup table means so as to obtain the digitized Cb component; and a third adder means for generating an output corresponding to the sum of an output of said third segment of said lookup table means, an output of said sixth segment of said lookup table means and an output of said ninth segment of said lookup table means so as to obtain the digitized Cr component;

a first complement means coupled to said address inputs of said lookup table means, said first complement means receiving said digitized R color component and generating 2's complement of said R color component when a most significant bit of the R color component is equal to 0;

a second complement means coupled to said address inputs of said lookup table means, said second complement means receiving said digitized G color component and generating 2's complement of said G color component when a most significant bit of the G color component is equal to 0;

a third complement means coupled to said address inputs of said lookup table means, said third complement means receiving said digitized B color component and generating 2's complement of said B color component when a most significant bit of the B color component is equal to 9;

a first polarity control means interconnecting said first segment of said lookup table means and said first adder means for inversing polarity of said corresponding R-in-Y transformation component value from said first segment of said lookup table means when said most significant bit of said R color component is equal to 0;

a second polarity control means interconnecting said second segment of said lookup table means and said second adder means for inversing polarity of said corresponding R-in-Cb transformation component value from said second segment of said lookup table means when said most significant bit of said R color component is equal to 0;

a third polarity control means interconnecting said third segment of said lookup table means and said third adder means for inversing polarity of said corresponding R-in-Cr transformation component value from said third segment of said lookup table means when said most significant bit of said R color component is equal to 0;

a fourth polarity control means interconnecting said fourth segment of said lookup table means and said first adder means for inversing polarity of said corresponding G-in-Y transformation component value from said fourth segment of said lookup table means when said most significant bit of said G color component is equal to 0;

a fifth polarity control means interconnecting said fifth segment of said lookup table means and said second adder means for inversing polarity of said corresponding G-in-Cb transformation component value from said fifth segment of said lookup table means when said most significant bit of said G color component is equal to 0;

a sixth polarity control means interconnecting said sixth segment of said lookup table means and said third adder means for inversing polarity of said corresponding G-in-Cr transformation component value from said sixth segment of said lookup table means when said most significant bit of said G color component is equal to 0;

a seventh polarity control means interconnecting said seventh segment of said lookup table means and said first adder means for inversing polarity of said corresponding B-in-Y transformation component value from said seventh segment of said lookup table means when said most significant bit of said B color component is equal to 0;

an eighth polarity control means interconnecting said eighth segment of said lookup table means and said second adder means for inversing polarity of said corresponding B-in-Cb transformation component value from said eighth segment of said lookup table means when said most significant bit of said B color component is equal to 0; and a ninth polarity control means interconnecting said ninth segment of said lookup table means and said third adder means for inversing polarity of said corresponding B-in-Cr transformation component value from said ninth segment of said lookup table means when said most significant bit of said B color component is equal to 0.

* * * * *

UNITED STATES PATENT AND TRADEMARK OFFICE
CERTIFICATE OF CORRECTION

PATENT NO. : 5,510,852
DATED : April 23, 1996
INVENTOR(S) : Rong-Fuh Shyu

It is certified that error appears in the above-indentified patent and that said Letters Patent is hereby corrected as shown below:

Column 14, line 6, Claim 5, "4" should be --3--.

Column 15, line 1, Claim 8, "Color" should be --color--.

Column 18, lines 9-13, Claim 10:

"an R-in-Cb component, a G-in-Cb component, a B-in-Cb component, an R-in-Cr values corresponding to an R-in-Y component, a G-in-Y component, a B-in-Y component, component, a G-in-Cr component and a B-in-Cr component based on a set of"

should be

--values corresponding to an R-in-Y component, a G-in-Y component, a B-in-Y component, an R-in-Cb component, a G-in-Cb component, a B-in-Cb component, an R-in-Cr component, a G-in-Cr component and a B-in-Cr component based on a set of--.

Column 19, line 3, Claim 10, "9" should be --0--.

Signed and Sealed this

Third Day of September, 1996

*Attest:*

BRUCE LEHMAN

*Attesting Officer*     *Commissioner of Patents and Trademarks*